(12) United States Patent
Yoshida et al.

(10) Patent No.: US 7,891,175 B2
(45) Date of Patent: Feb. 22, 2011

(54) EXHAUST PURIFICATION DEVICE OF COMPRESSION IGNITION TYPE INTERNAL COMBUSTION ENGINE

(75) Inventors: Kohei Yoshida, Gotenba (JP); Kotaro Hayashi, Mishima (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 349 days.

(21) Appl. No.: 12/224,659

(22) PCT Filed: Mar. 23, 2007

(86) PCT No.: PCT/JP2007/057004

§ 371 (c)(1),
(2), (4) Date: Sep. 3, 2008

(87) PCT Pub. No.: WO2007/111373

PCT Pub. Date: Oct. 4, 2007

(65) Prior Publication Data

US 2009/0031709 A1    Feb. 5, 2009

(30) Foreign Application Priority Data

Mar. 23, 2006   (JP) .............................. 2006-081025

(51) Int. Cl.
*F01N 3/00* (2006.01)
*F01N 3/10* (2006.01)
*F01N 3/02* (2006.01)

(52) U.S. Cl. .............................. 60/295; 60/285; 60/286; 60/297; 60/301; 60/311

(58) Field of Classification Search .................. 60/276, 60/285, 286, 295, 297, 301, 311; 422/171, 422/177, 188, 189

See application file for complete search history.

(56) References Cited

U.S. PATENT DOCUMENTS

2001/0036901 A1 * 11/2001 Koda et al. .................. 502/304

(Continued)

FOREIGN PATENT DOCUMENTS

JP         B2-2658754         6/1997

(Continued)

OTHER PUBLICATIONS

Ogawara et al., English abstract of JP 11-257051 A, Sep. 21, 1999.*

(Continued)

*Primary Examiner*—Thomas E Denion
*Assistant Examiner*—Audrey Klasterka
(74) *Attorney, Agent, or Firm*—Oliff & Berridge, PLC

(57) ABSTRACT

An internal combustion engine in which an $SO_x$ trap catalyst able to trap $SO_x$ contained in exhaust gas is arranged in an engine exhaust passage upstream of an $NO_x$ storing catalyst. The $SO_x$ trap catalyst is strengthened in basicity compared with the $NO_x$ storing catalyst to an extent so that when the temperature of the $SO_x$ trap catalyst is in the temperature range at the time of ordinary operation, that is, substantially 150° C. to substantially 400° C., the $NO_x$ purification rate by the $SO_x$ trap catalyst becomes less than substantially 10 percent of the $NO_x$ purification rate by the $NO_x$ storing catalyst. When $NO_x$ should be released from the $NO_x$ storing catalyst, the air-fuel ratio of the exhaust gas flowing into the $SO_x$ trap catalyst is temporarily switched from lean to rich.

12 Claims, 12 Drawing Sheets

U.S. PATENT DOCUMENTS

| | | |
|---|---|---|
| 2003/0134743 A1 | 7/2003 | Sumida et al. |
| 2003/0159435 A1 | 8/2003 | Berris et al. |
| 2005/0145827 A1 | 7/2005 | McCabe et al. |
| 2005/0164879 A1* | 7/2005 | Chen .......................... 502/328 |
| 2005/0170954 A1 | 8/2005 | Yoshida et al. |
| 2006/0064969 A1 | 3/2006 | Yoshida et al. |

FOREIGN PATENT DOCUMENTS

| | | |
|---|---|---|
| JP | A-10-205326 | 8/1998 |
| JP | A-11-156159 | 6/1999 |
| JP | 11257051 A * | 9/1999 |
| JP | A-2005-133610 | 5/2000 |
| JP | A-2004-058054 | 2/2004 |
| JP | A-2004-092524 | 3/2004 |
| JP | A-2005-211862 | 8/2005 |
| WO | WO 2005040571 A1 * | 5/2005 |

OTHER PUBLICATIONS

Nov. 5, 2009 Supplementary Search Report issued in European Patent Application No. 07740442.4.

* cited by examiner

Fig.3
(A)
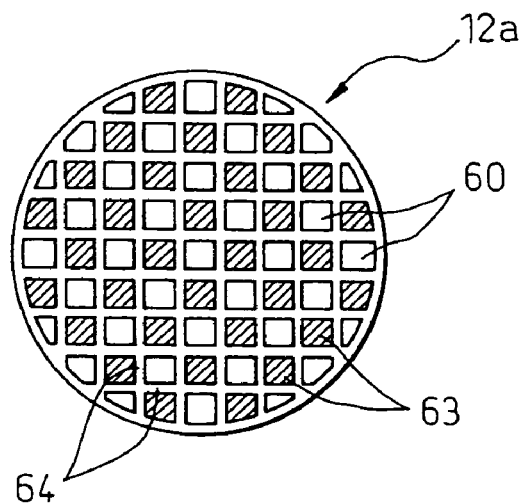
(B)
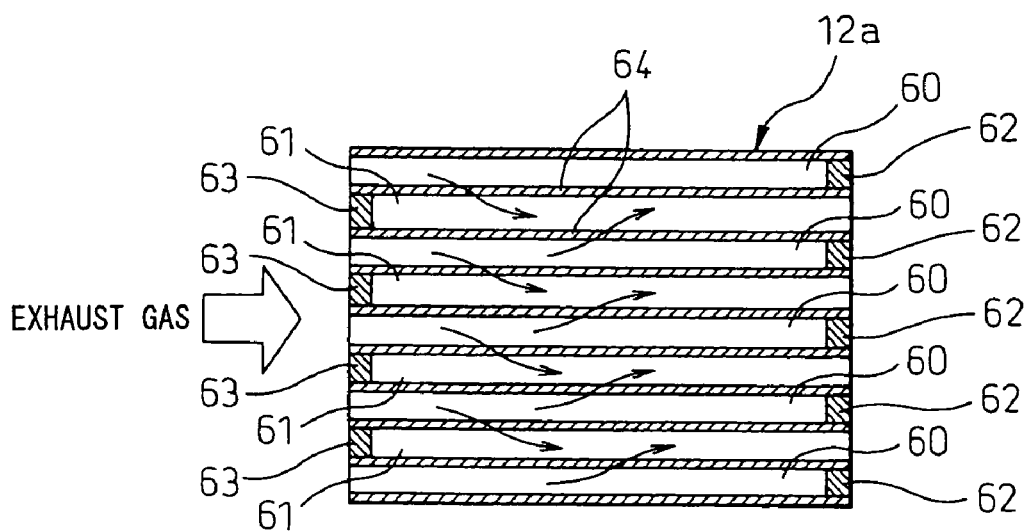

Fig. 8
(A)
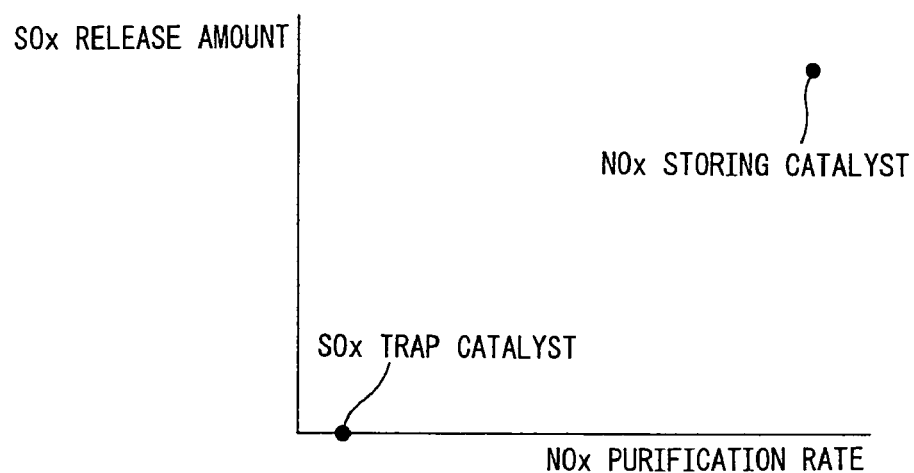
(B)
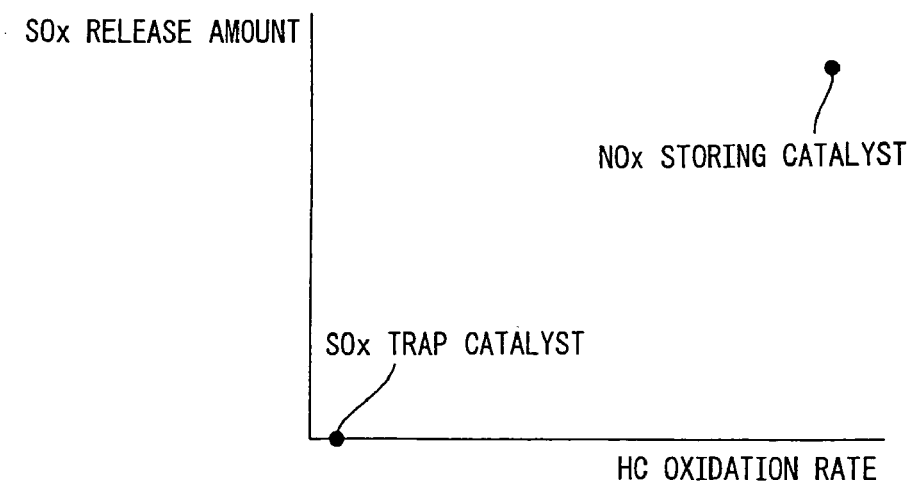

Fig.9
(A)
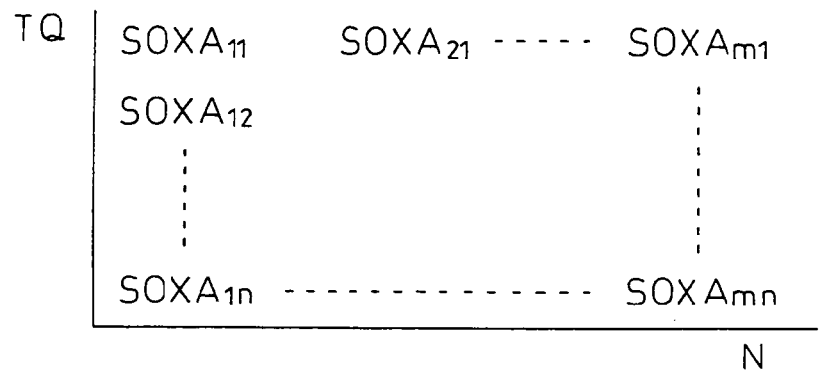
(B)
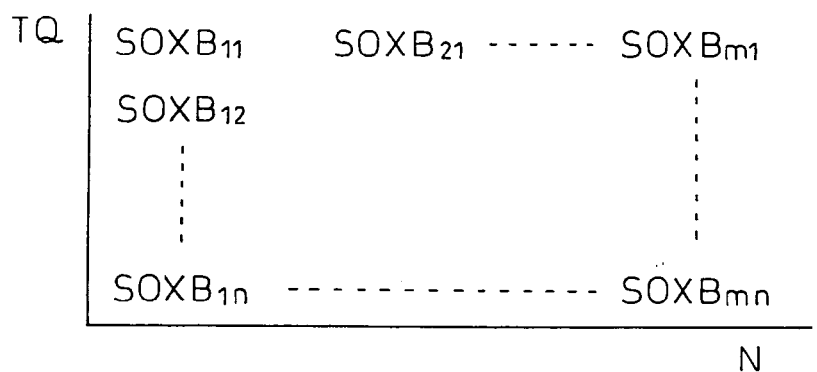
(C)
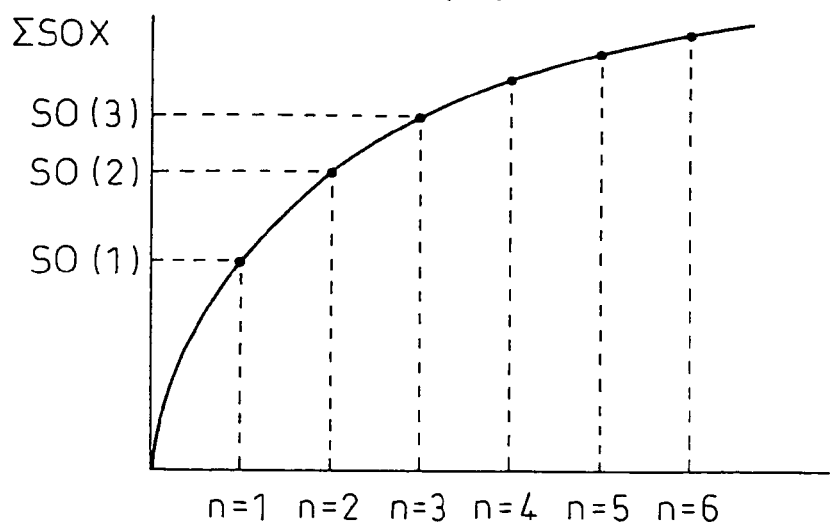

EXHAUST PURIFICATION DEVICE OF COMPRESSION IGNITION TYPE INTERNAL COMBUSTION ENGINE

TECHNICAL FIELD

The present invention relates to an exhaust purification device of a compression ignition type internal combustion engine.

BACKGROUND ART

Known in the art is an internal combustion engine having arranged in an engine exhaust passage an $NO_x$ storing catalyst which stores $NO_x$ contained in exhaust gas when the air-fuel ratio of the inflowing exhaust gas is lean and releases the stored $NO_x$ when the air-fuel ratio of the inflowing exhaust gas becomes the stoichiometric air-fuel ratio or rich. In this internal combustion engine, the $NO_x$ produced when burning fuel under a lean air-fuel ratio is stored in the $NO_x$ storing catalyst. On the other hand, when the $NO_x$ storing capability of the $NO_x$ storing catalyst approaches saturation, the air-fuel ratio of the exhaust gas is temporarily made rich and thereby the $NO_x$ is released from the $NO_x$ storing catalyst and reduced.

However, the fuel and lubrication oil contain sulfur. Therefore, the exhaust gas contains $SO_x$. This $SO_x$ is stored in the $NO_x$ storing catalyst along with the $NO_x$. However, this $SO_x$ is not released from the $NO_x$ storing catalyst just by making the air-fuel ratio of the exhaust gas rich. Therefore, the amount of $SO_x$ stored in the $NO_x$ storing catalyst gradually increases. As a result, the amount of $NO_x$ which can be stored ends up gradually decreasing.

Known in the art therefore is an internal combustion engine having an $SO_x$ trap agent arranged in the engine exhaust passage upstream of the $NO_x$ storing catalyst so as to prevent $SO_x$ from being sent to the $NO_x$ storing catalyst (see Japanese Unexamined Patent Publication (Kokai) No. 2004-92524). In this internal combustion engine, the $SO_x$ contained in the exhaust gas is trapped by the $SO_x$ trap agent. Therefore, the $SO_x$ is prevented from flowing into the $NO_x$ storing catalyst. As a result, the storing capability of the $NO_x$ can be prevented from dropping due to storage of $SO_x$.

However, in this internal combustion engine, before the $SO_x$ trap agent becomes saturated in $SO_x$ trap ability, $SO_x$ is released from the $SO_x$ trap agent. In this case, to make the $SO_x$ trap agent release the $SO_x$ well, when the temperature of the $SO_x$ trap agent is the $SO_x$ release temperature, the exhaust gas has to be made a rich air-fuel ratio. Therefore, in this internal combustion engine, to make the $SO_x$ trap agent release the $SO_x$, when the temperature of the $SO_x$ trap agent is the $SO_x$ release temperature, the exhaust gas is made a rich air-fuel ratio.

Further, this internal combustion engine is provided with a bypass exhaust passage bypassing the $NO_x$ storing catalyst so as to prevent the $SO_x$ released from the $SO_x$ trap agent from flowing into the $NO_x$ storing catalyst. When $SO_x$ is released from the $SO_x$ trap agent, the exhaust gas flowing out from the $SO_x$ trap agent is guided to the inside of the bypass exhaust passage.

On the other hand, in this internal combustion engine, when the $SO_x$ trap amount of the $SO_x$ trap agent becomes a certain amount or more, even if the temperature of the $SO_x$ trap agent is less than the $SO_x$ release temperature when the exhaust gas is made a rich air-fuel ratio so as to make the $NO_x$ storing catalyst release $NO_x$, the $SO_x$ trap agent ends up releasing $SO_x$ and therefore the $SO_x$ ends up being stored in the $NO_x$ storing catalyst. Therefore, in this internal combustion engine, when the $SO_x$ trap amount of the $SO_x$ trap agent becomes a certain amount or more, the exhaust gas is prohibited from being made a rich air-fuel ratio.

However, in this case, if using an $SO_x$ trap agent which does not release $SO_x$ when the exhaust gas is made a rich air-fuel ratio to make the $NO_x$ storing catalyst release the $NO_x$, $SO_x$ is no longer stored in the $NO_x$ storing catalyst. Further, when $NO_x$ should be released from the $NO_x$ storing catalyst should release $NO_x$, it is possible to make the exhaust gas a rich air-fuel ratio at all times. However, so long as giving the $SO_x$ trap agent the function of releasing $SO_x$ such as in this internal combustion engine, it is difficult to prevent $SO_x$ from being released when the exhaust gas becomes a rich air-fuel ratio.

DISCLOSURE OF THE INVENTION

The present invention provides an exhaust purification device of a compression ignition type internal combustion engine giving the $SO_x$ trap catalyst only the function of storing $SO_x$ without releasing the $SO_x$ so that even when the air-fuel ratio of the exhaust gas is made rich to release $NO_x$ from the $NO_x$ storing catalyst, the $SO_x$ trap catalyst will not release $SO_x$.

According to the present invention, there is provided an exhaust purification device of a compression ignition type internal combustion engine arranging in an engine exhaust passage an $SO_x$ trap catalyst able to trap $SO_x$ contained in an exhaust gas and arranging in the exhaust passage downstream of the $SO_x$ trap catalyst an $NO_x$ storing catalyst storing $NO_x$ contained in the exhaust gas when an air-fuel ratio of an inflowing exhaust gas is lean and releasing stored $NO_x$ when the air-fuel ratio of the inflowing exhaust gas becomes a stoichiometric air-fuel ratio or rich, wherein the $SO_x$ trap catalyst is strengthened in basicity and is weakened in oxidizability compared with the $NO_x$ storing catalyst to an extent so that when a temperature of the $SO_x$ trap catalyst is substantially 150° C. to substantially 400° C., the $NO_x$ purification rate by the $SO_x$ trap catalyst becomes less than substantially 10 percent of the $NO_x$ purification rate by the $NO_x$ storing catalyst, and, when $NO_x$ should be released from the $NO_x$ storing catalyst, the air-fuel ratio of the exhaust gas flowing into the $SO_x$ trap catalyst is temporarily switched from lean to rich.

BRIEF DESCRIPTION OF THE DRAWINGS

FIG. 3 is a view of the structure of a particulate filter;

FIG. 8 is a view showing the relationship between the $NO_x$ purification rate and the $SO_x$ release amount etc.;

FIG. 9 is a view of the relationship between a stored $SO_x$ amount $\Sigma SOX$ and a stored $SO_x$ amount $SO(n)$ for temperature raising control etc.;

BEST MODE FOR CARRYING OUT THE INVENTION

Figure 1:
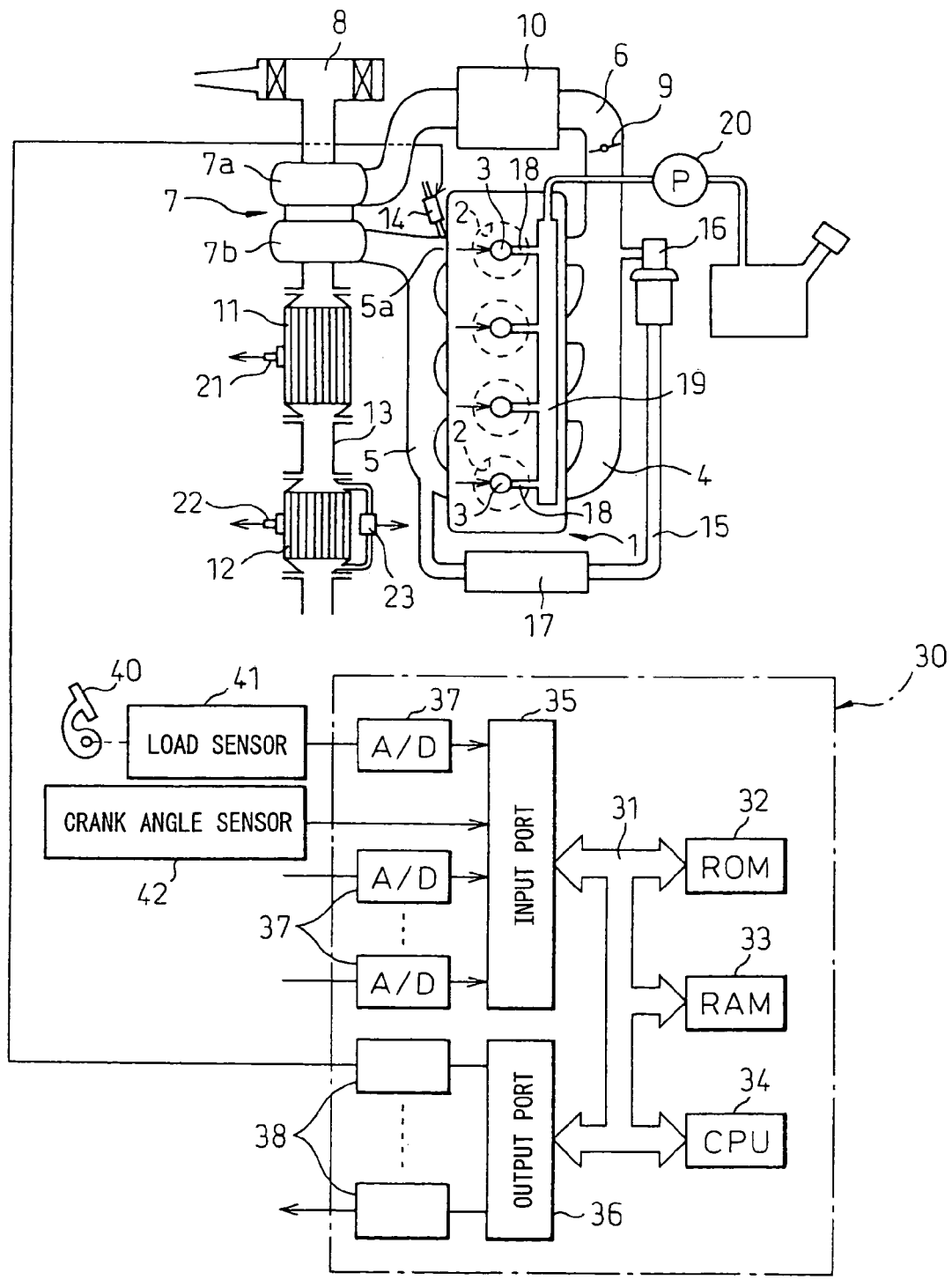
FIG. 1 is an overview of a compression ignition type internal combustion engine.

FIG. 1 shows an overview of a compression ignition type internal combustion engine.

Referring to FIG. 1, 1 indicates an engine body, 2 a combustion chamber of each cylinder, 3 an electronically controlled fuel injector for injecting fuel into each combustion chamber 2, 4 an intake manifold, and 5 an exhaust manifold. The intake manifold 4 is connected through an intake duct 6 to an outlet of a compressor 7a of an exhaust turbocharger 7. The inlet of the compressor 7a is connected to an air cleaner 8. Inside the intake duct 6 is arranged a throttle valve 9 driven by a step motor. Further, around the intake duct 6 is arranged a cooling device 10 for cooling the intake air flowing through the inside of the intake duct 6. In the embodiment shown in FIG. 1, the engine cooling water is guided into the cooling device 10. The engine cooling water cools the intake air.

On the other hand, the exhaust manifold 5 is connected to an inlet of an exhaust turbine 7b of the exhaust turbocharger 7, while the outlet of the exhaust turbine 7b is connected to an inlet of an $SO_x$ trap catalyst 11. Further, the outlet of the $SO_x$ trap catalyst 11 is connected through an exhaust pipe 13 to an $NO_x$ storing catalyst 12. As shown in FIG. 1, a reducing agent supply valve 14 for supplying a reducing agent comprised of for example hydrocarbons is arranged in the manifold branch 5a of for example the No. 1 cylinder of the exhaust manifold 5.

The exhaust manifold 5 and the intake manifold 4 are interconnected through an exhaust gas recirculation (hereinafter referred to as "EGR") passage 15. The EGR passage 15 is provided with an electronically controlled EGR control valve 16. Further, around the EGR passage 15 is arranged a cooling device 17 for cooling the EGR gas flowing through the inside of the EGR passage 15. In the embodiment shown in FIG. 1, the engine cooling water is guided into the cooling device 17. The engine cooling water cools the EGR gas. On the other hand, each fuel injector 3 is connected through a fuel feed tube 18 to a common rail 19. This common rail 19 is supplied with fuel from an electronically controlled variable discharge fuel pump 20. The fuel supplied into the common rail 19 is supplied through each fuel feed tube 18 to the fuel injector 3.

An electronic control unit 30 is comprised of a digital computer provided with a read only memory (ROM) 32, a random access memory (RAM) 33, a microprocessor (CPU) 34, an input port 35, and an output port 36 all connected to each other by a bidirectional bus 31. The $SO_x$ trap catalyst 11 is provided with a temperature sensor 21 for detecting the temperature of the $SO_x$ trap catalyst 11. The $NO_x$ storing catalyst 12 is provided with a temperature sensor 22 for detecting the temperature of the $NO_x$ storing catalyst 12. The output signals of the temperature sensors 21 and 22 are input through corresponding AD converters 37 to the input port 35. Further, the $NO_x$ storing catalyst 12 is provided with a differential pressure sensor 23 for detecting the differential pressure before and after the $NO_x$ storing catalyst 12. The output signal of the differential pressure sensor 23 is input through the corresponding AD converter 37 to the input port 35.

An accelerator pedal 40 has a load sensor 41 generating an output voltage proportional to the amount of depression L of the accelerator pedal 40 connected to it. The output voltage of the load sensor 41 is input through a corresponding AD converter 37 to the input port 35. Further, the input port 35 has a crank angle sensor 42 generating an output pulse each time the crankshaft turns for example by 15 degrees connected to it. On the other hand, the output port 36 is connected through corresponding drive circuits 38 to the fuel injectors 3, throttle valve 9 step motor, reducing agent supply valve 14, EGR control valve 16, and fuel pump 20.

Figure 2:
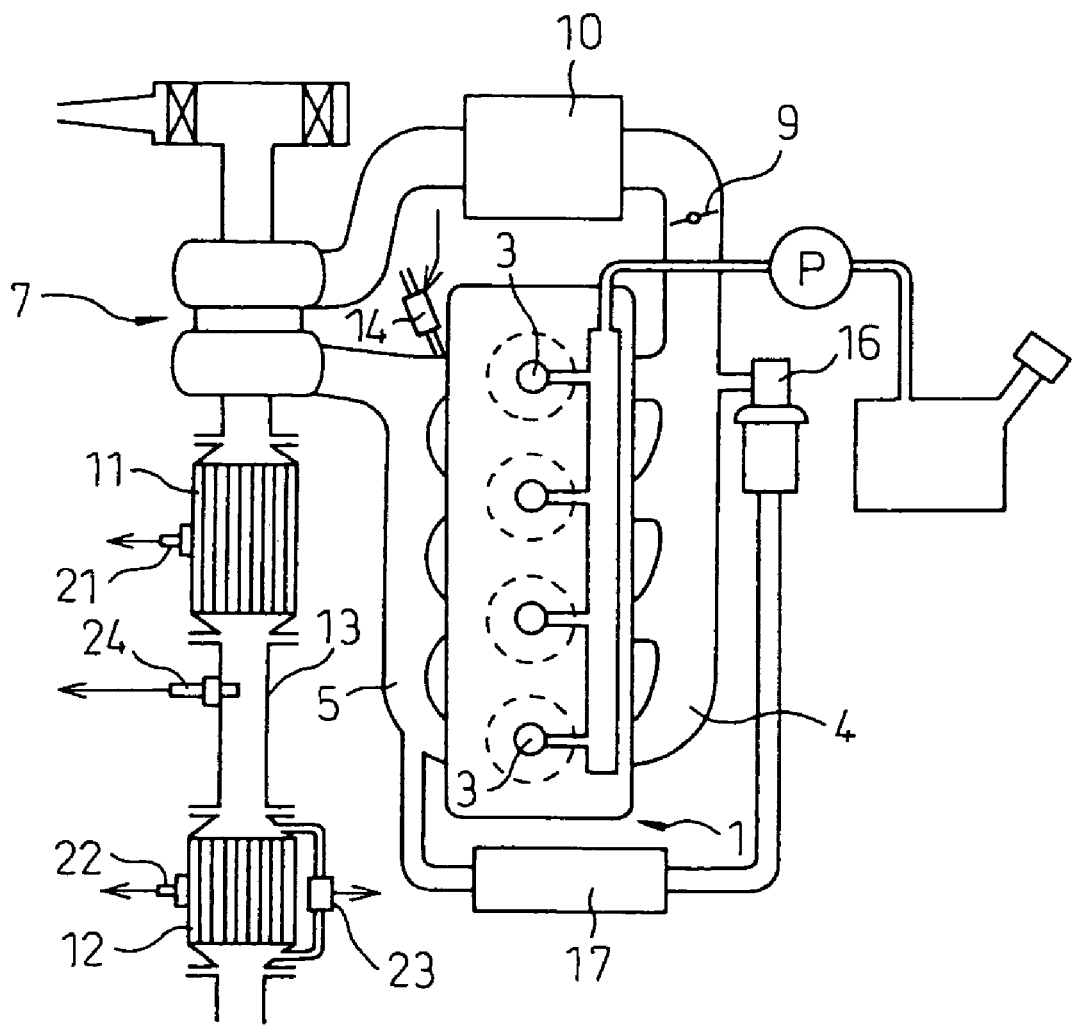
FIG. 2 is an overview of another embodiment of a compression ignition type internal combustion engine.

FIG. 2 shows another embodiment of a compression ignition type internal combustion engine. In this embodiment, the exhaust pipe 13 is provided with an $SO_x$ sensor 24 for detecting the concentration of $SO_x$ in the exhaust gas flowing out from the $SO_x$ trap catalyst 11.

First, explaining the $NO_x$ storing catalyst 12 shown in FIG. 1 and FIG. 2, the $NO_x$ storing catalyst 12 is carried on a three-dimensional mesh structure monolith carrier or pellet carriers or is carried on a honeycomb structure particulate filter. In this way, the $NO_x$ storing catalyst 12 can be carried on various types of carriers, but below, the explanation will be made of the case of carrying the $NO_x$ storing catalyst 12 on a particulate filter.

FIGS. 3(A) and 3(B) show the structure of the particulate filter 12a carrying the $NO_x$ storing catalyst 12. Note that FIG. 3(A) is a front view of the particulate filter 12a, while FIG. 3(B) is a side sectional view of the particulate filter 12a. As shown in FIGS. 3(A) and 3(B), the particulate filter 12a forms a honeycomb structure and is provided with a plurality of exhaust passages 60 and 61 extending in parallel with each other. These exhaust passages are comprised by exhaust gas inflow passages 60 with downstream ends sealed by plugs 62 and exhaust gas outflow passages 61 with upstream ends sealed by plugs 63. Note that the hatched portions in FIG. 3(A) show plugs 63. Therefore, the exhaust gas inflow passages 60 and the exhaust gas outflow passages 61 are arranged alternately through thin wall partitions 64. In other words, the exhaust gas inflow passages 60 and the exhaust gas outflow passages 61 are arranged so that each exhaust gas inflow passage 60 is surrounded by four exhaust gas outflow passages 61, and each exhaust gas outflow passage 61 is surrounded by four exhaust gas inflow passages 60.

The particulate filter 12a is formed from a porous material such as for example cordierite. Therefore, the exhaust gas flowing into the exhaust gas inflow passages 60 flows out into the adjoining exhaust gas outflow passages 61 through the surrounding partitions 64 as shown by the arrows in FIG. 3(B).

Figure 4:
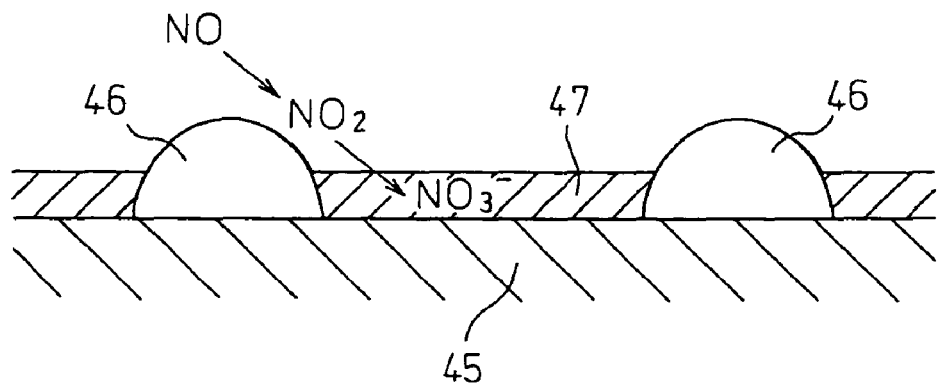
FIG. 4 is a sectional view of a surface part of catalyst carrier of an $NO_x$ storing catalyst.

When the $NO_x$ storing catalyst 12 is carried on the particulate filter 12a in this way, the peripheral walls of the exhaust gas inflow passages 60 and exhaust gas outflow passages 61, that is, the surfaces of the two sides of the partitions 64 and inside walls of the fine holes of the partitions 64 carry a catalyst carrier comprised of alumina. FIG. 4 schematically shows the cross-section of the surface part of this catalyst carrier 45. As shown in FIG. 4, the catalyst carrier 45 carries a precious metal catalyst 46 diffused on its surface. Further, the catalyst carrier 45 is formed with a layer of an $NO_x$ absorbent 47 on its surface.

In this embodiment of the present invention, platinum Pt is used as the precious metal catalyst 46. As the ingredient forming the $NO_x$ absorbent 47, for example, at least one element selected from potassium K, sodium Na, cesium Cs, or another alkali metal, barium Ba, calcium Ca, or another alkali earth, lanthanum La, yttrium Y, or another rare earth may be used.

If the ratio of the air and fuel (hydrocarbons) supplied to the engine intake passage, combustion chambers 2, and exhaust passage upstream of the $NO_x$ storing catalyst 12 is referred to as the "air-fuel ratio of the exhaust gas", the $NO_x$ absorbent 47 performs an $NO_x$ absorption and release action of storing the $NO_x$ when the air-fuel ratio of the exhaust gas is lean and releasing the stored $NO_x$ when the oxygen concentration in the exhaust gas falls.

That is, if explaining this taking as an example the case of using barium Ba as the ingredient forming the $NO_x$ absorbent 47, when the air-fuel ratio of the exhaust gas is lean, that is, when the oxygen concentration in the exhaust gas is high, the NO contained in the exhaust gas is oxidized on the platinum Pt 46 such as shown in FIG. 4 to become $NO_2$, then is absorbed in the $NO_x$ absorbent 47 and diffuses in the $NO_x$ absorbent 47 in the form of nitric acid ions $NO_3^-$ while bonding with the barium oxide BaO. In this way, the $NO_x$ is absorbed in the $NO_x$ absorbent 47. So long as the oxygen concentration in the exhaust gas is high, $NO_2$ is produced on the surface of the platinum Pt 46. So long as the $NO_x$ absorbing capability of the $NO_x$ absorbent 47 is not saturated, the $NO_2$ is absorbed in the $NO_x$ absorbent 47 and nitric acid ions $NO_3^-$ are produced.

As opposed to this, by supplying a reducing agent from the reducing agent supply valve 14 to make the air-fuel ratio of the exhaust gas rich or the stoichiometric air-fuel ratio, since the oxygen concentration in the exhaust gas falls, the reaction proceeds in the reverse direction ($NO_3^- \rightarrow NO_2$) and therefore the nitric acid ions $NO_3^-$ in the $NO_x$ absorbent 47 are released from the $NO_x$ absorbent 47 in the form of $NO_2$. Next, the released $NO_x$ is reduced by the unburned hydrocarbons or CO included in the exhaust gas.

In this way, when the air-fuel ratio of the exhaust gas is lean, that is, when burning fuel under a lean air-fuel ratio, the $NO_x$ in the exhaust gas is absorbed in the $NO_x$ absorbent 47. However, if continuing to burn fuel under a lean air-fuel ratio, during that time the $NO_x$ absorbing capability of the $NO_x$ absorbent 47 will end up becoming saturated and therefore $NO_x$ will end up no longer being able to be absorbed by the $NO_x$ absorbent 47. Therefore, in this embodiment according to the present invention, before the absorbing capability of the $NO_x$ absorbent 47 becomes saturated, a reducing agent is supplied from the reducing agent supply valve 14 so as to temporarily make the air-fuel ratio of the exhaust gas rich and thereby release the $NO_x$ from the $NO_x$ absorbent 47.

However, exhaust gas contains $SO_x$, that is, $SO_2$. When this $SO_2$ flows into the $NO_x$ storing catalyst 12, this $SO_2$ is oxidized at the platinum Pt 46 and becomes $SO_3$. Next, this $SO_3$ is absorbed in the $NO_x$ absorbent 47 and bonds with the barium oxide BaO while diffusing in the $NO_x$ absorbent 47 in the form of sulfate ions $SO_4^{2-}$ to produce the sulfate $BaSO_4$. If the sulfate $BaSO_4$ increases, the absorption amount of $NO_x$ is reduced and therefore the amount of $NO_x$ which the $NO_x$ absorbent 47 can absorb will fall along with the elapse of time.

Therefore, in the present invention, an $SO_x$ trap catalyst 11 is arranged upstream of the $NO_x$ storing catalyst 12 and this $SO_x$ trap catalyst 11 is used to trap the $SO_x$ contained in the exhaust gas and thereby prevent $SO_x$ from flowing into the $NO_x$ storing catalyst 12. Next, this $SO_x$ trap catalyst 11 will be explained.

Figure 5:
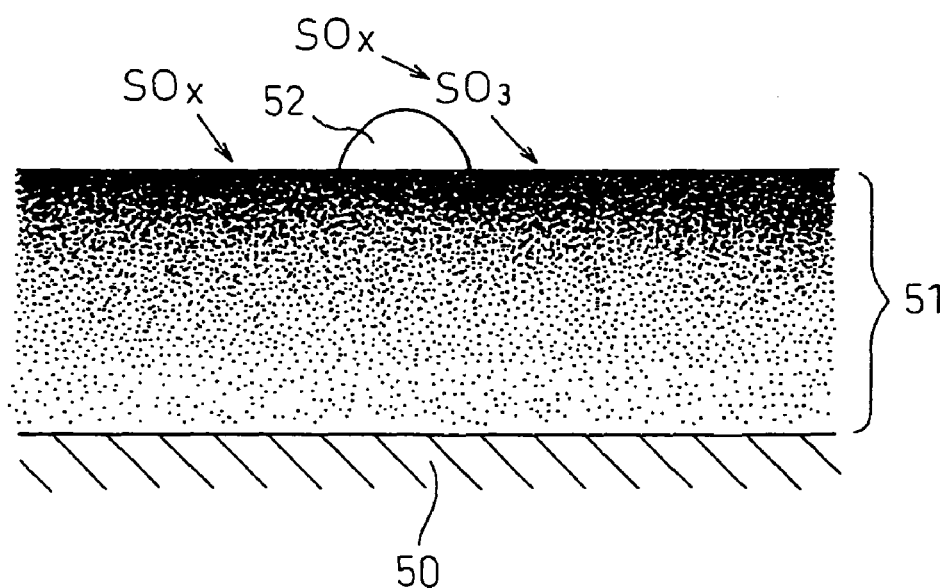
FIG. 5 is a sectional view of a surface part of a catalyst carrier of an $SO_x$ trap catalyst.

The $SO_x$ trap catalyst 11 is comprised of for example a honeycomb structure monolithic catalyst and has a large number of exhaust gas through holes extending straight in the axial direction of the $SO_x$ trap catalyst 11. When forming the $SO_x$ trap catalyst 11 from a honeycomb structure monolithic catalyst in this way, the inside peripheral walls of the exhaust gas through holes carry a catalyst carrier comprised of for example alumina. FIG. 5 schematically shows the cross-section of the surface part of this catalyst carrier 50. As shown in FIG. 5, the catalyst carrier 50 is formed with a coated layer 51 on its surface. Further, the coated layer 51 carries a precious metal catalyst 52 diffused on its surface.

In this embodiment of the present invention, platinum Pt is used as the precious metal catalyst 52. As the ingredient forming the coated layer 51, for example, at least one element selected from potassium K, sodium Na, cesium Cs, or another alkali metal, barium Ba, calcium Ca, or another alkali earth, lanthanum La, yttrium Y, or another rare earth may be used. That is, the coated layer 51 of the $SO_x$ trap catalyst 11 exhibits a strong basicity.

Therefore, the $SO_x$ contained in the exhaust gas, that is, the $SO_2$, is oxidized at the platinum 52 as shown in FIG. 5, then is trapped in the coated layer 51. That is, the $SO_2$ diffuses in the coated layer 51 in the form of sulfate ions $SO_4^{2-}$ to form a sulfate. Note that as explained above, the coated layer 51 exhibits a strong basicity. Therefore, part of the $SO_2$ contained in the exhaust gas is directly trapped in the coated layer 51 as shown in FIG. 5.

The concentration in the coated layer 51 in FIG. 5 shows the concentration of trapped $SO_x$. As will be understood from FIG. 5, the concentration of $SO_x$ in the coated layer 51 is highest near the surface of the coated layer 51 and gradually becomes lower the further deeper. If the $SO_x$ concentration near the surface of the coated layer 51 becomes high, the basicity of the surface of the coated layer 51 becomes weaker and the $SO_x$ trap capability becomes weaker. Therefore, if the ratio in amount of the $SO_x$ trapped by the $SO_x$ trap catalyst 11 to the $SO_x$ contained in the exhaust gas is referred to as the "$SO_x$ trap rate", the $SO_x$ trap rate falls along with the basicity of the surface of the coated layer 51 becoming weaker.

Figure 6:
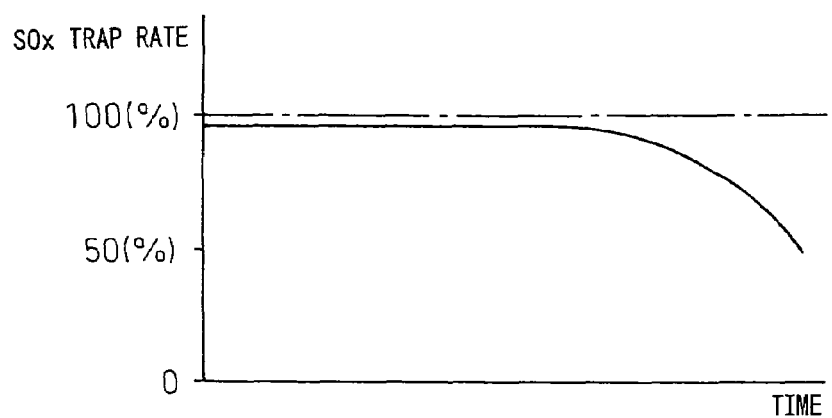
FIG. 6 is a view of an $SO_x$ trap rate.
Figure 7:
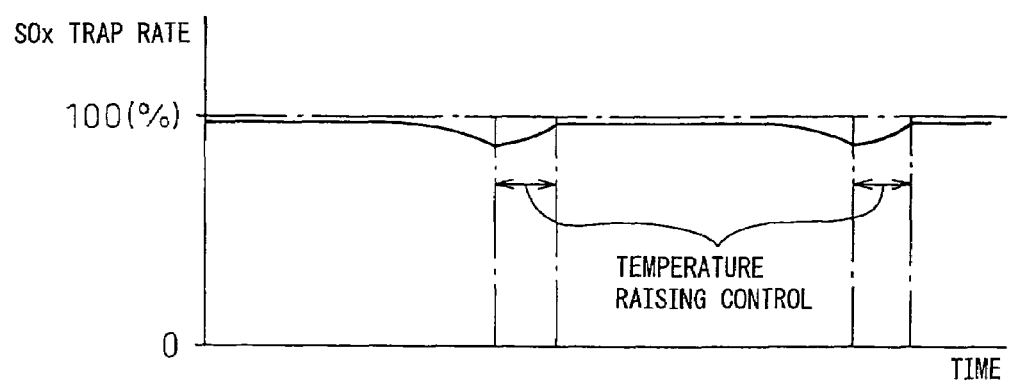
FIG. 7 is a view for explaining temperature raising control.

FIG. 6 shows the changes in the $SO_x$ trap rate along with time. As shown in FIG. 6, the $SO_x$ trap rate is first close to 100 percent, but rapidly falls along with the elapse of time. Therefore, in the present invention, as shown in FIG. 7, when the $SO_x$ trap rate falls below a predetermined rate, temperature raising control is performed to raise the temperature of the $SO_x$ trap catalyst 11 under a lean air-fuel ratio of the exhaust gas and thereby restore the $SO_x$ trap rate.

That is, if raising the temperature of the $SO_x$ trap catalyst 11 under a lean air-fuel ratio of the exhaust gas, the $SO_x$ concentrated near the surface of the coated layer 51 diffuses toward the deep part of the coated layer 51 so that the $SO_x$ concentration in the coated layer 51 becomes even. That is, the sulfate produced in the coated layer 51 changes from an unstable state concentrated near the surface of the coated layer 51 to a stable state evenly diffused across the entirety of the inside of the coated layer 51. If the $SO_x$ present near the surface of the coated layer 51 diffuses toward the deep part of the coated layer 51, the concentration of $SO_x$ near the surface of the coated layer 51 will fall. Therefore, when the temperature raising control of the $SO_x$ trap catalyst 11 is completed, the $SO_x$ trap rate will be restored as shown in FIG. 7.

When performing temperature raising control of the $SO_x$ trap catalyst 11, if making the temperature of the $SO_x$ trap catalyst 11 substantially 450° C. or so, the $SO_x$ present near the surface of the coated layer 51 can be made to diffuse in the coated layer 51. If raising the temperature of the $SO_x$ trap catalyst 11 to about 600° C., the concentration of $SO_x$ in the coated layer 51 can be made considerably even. Therefore, at the time of temperature raising control of the $SO_x$ trap catalyst 11, it is preferable to raise the temperature of the $SO_x$ trap catalyst 11 to about 600° C. under a lean air-fuel ratio of the exhaust gas.

Now, as explained above, in this embodiment according to the present invention, before the $NO_x$ absorbent 47 becomes saturated in absorption ability, reducing agent is fed from the reducing agent supply valve 14 so as to make the air-fuel ratio of the exhaust gas temporarily rich and thereby make the $NO_x$ absorbent 47 release the $NO_x$. Therefore, at this time, the air-fuel ratio of the exhaust gas flowing into the $SO_x$ trap catalyst 11 becomes temporarily rich. However, at this time, if the $SO_x$ trap catalyst 11 ends up releasing $SO_x$, this $SO_x$ is absorbed in the $NO_x$ storing catalyst 12. Therefore, in the present invention, the $SO_x$ trap catalyst 11 is formed so that the $SO_x$ trap catalyst 11 does not release $SO_x$ at this time.

That is, if making the $SO_x$ trap catalyst 11 stronger in basicity, the trapped $NO_x$ becomes harder to release. Therefore, to prevent $SO_x$ from being released, it is preferable to make the $SO_x$ trap catalyst 11 stronger in basicity. Further, the phenomenon of release of $SO_x$ is a phenomenon of reduction and release of the $SO_x$ oxidized and absorbed. Therefore, to prevent $SO_x$ from being released, $SO_x$ has to be prevented from being reduced. In this case, the $SO_x$ reduction action is performed by the reducing agent, that is, HC, supplied from the reducing agent supply valve 14, so to prevent $SO_x$ from being released, the function of reducing $NO_x$ by HC, that is, the function of oxidation of HC by $NO_x$, has to be weakened.

However, the $SO_x$ trapping action is performed by the coat layer 51. Therefore, to prevent $SO_x$ from being released, the basicity of the coat layer 51 must be strengthened. Further, the $SO_x$ reduction action is performed by the precious metal catalyst 46, therefore to prevent $SO_x$ from being released, the action of reduction of $SO_x$ by the precious metal catalyst 46, that is, the HC oxidation action, must be weakened. In this case, if strengthening the basicity of the coat layer 51, the action of HC by the precious metal catalyst 46, that is, the oxidizability, is weakened.

Therefore, in the present invention, to prevent $SO_x$ from being released, the basicity of the coat layer 51, that is, the basicity of the $SO_x$ trap catalyst 11, is strengthened and the oxidizability is weakened. In this case, it is difficult to express quantitatively to what extent to strengthen the basicity of the $SO_x$ trap catalyst 11 and to what extent to weaken the oxidizability, but to what extent to strengthen the basicity and to what extent to weaken the oxidizability may be expressed using the $NO_x$ purification rate or HC oxidation rate compared with the $NO_x$ storing catalyst 12. Next, this will be explained with reference to FIG. 8.

FIG. 8(A) shows the relationship between the $NO_x$ purification rate and $SO_x$ release rate of the $SO_x$ trap catalyst 11 and $NO_x$ storing catalyst 12 used in the present invention, while FIG. 8(B) shows the relationship between the HC oxidation rate and $SO_x$ release rate of the $SO_x$ trap catalyst 11 and the $NO_x$ storing catalyst 12 used in the present invention. Note that the relationships shown in FIG. 8(A) and FIG. 8(B) are those at the time when the temperature of the $SO_x$ trap catalyst 11 is the temperature range at the time of ordinary operation, that is, substantially 150° C. to substantially 400° C. The $NO_x$ storing catalyst 12 has as its object the purification of $NO_x$ by repeating the storage and release of $NO_x$, so as shown in FIG. 8(A) and FIG. 8(B), naturally, $NO_x$ purification rate and HC oxidation rate are high.

However, as shown in FIGS. 8(A) and (B), the $NO_x$ storing catalyst 12 releases a considerable amount of $SO_x$. Of course, this $SO_x$ release action is performed when the exhaust gas is made a rich air-fuel ratio. As opposed to this, in the present invention, the basicity of the $SO_x$ trap catalyst 11 is strengthened and the oxidizability is weakened compared with the $NO_x$ storing catalyst 12 so that the $SO_x$ release amount becomes zero when the temperature of the $SO_x$ trap catalyst is the temperature range at the time of ordinary operation, that is, substantially 150° C. to substantially 400° C. If the basicity of the $SO_x$ trap catalyst 11 is strengthened and the oxidizability is weakened compared with the $NO_x$ storing catalyst 12 in this way, the $SO_x$ trap catalyst 11 absorbs $NO_x$, but can no longer release the absorbed $NO_x$, so, as shown in FIG. 8(A), the $NO_x$ purification rate of the $SO_x$ trap catalyst 11 becomes considerably low.

In this case, if strengthening the basicity of the $SO_x$ trap catalyst 11 and weakening the oxidizability until the $SO_x$ release rate becomes zero when the temperature of the $SO_x$ trap catalyst is the temperature range at the time of ordinary operation, that is, substantially 150° C. to substantially 400° C., the $NO_x$ purification rate when using the $SO_x$ trap catalyst 11 becomes less than substantially 10 percent of the $NO_x$ purification rate when using the $NO_x$ storing catalyst 12. Therefore, it can also be said that the $SO_x$ trap catalyst 11 is strengthened in basicity and weakened in oxidizability compared with the $NO_x$ storing catalyst 12 to an extent so that when the temperature of the $SO_x$ trap catalyst is in the temperature range at the time of ordinary operation, that is, substantially 150° C. to substantially 400° C., the $NO_x$ purification rate by the $SO_x$ trap catalyst 11 becomes less than substantially 10 percent of the $NO_x$ purification rate by the $NO_x$ storing catalyst 12.

On the other hand, as will be understood from FIG. 8(B), when the temperature of the $SO_x$ trap catalyst is in the temperature range at the time of ordinary operation, that is, substantially 150° C. to substantially 400° C., if strengthening the basicity of the $SO_x$ trap catalyst 11 and weakening the oxidizability until the $SO_x$ release rate becomes zero, the HC oxidation rate when using the $SO_x$ trap catalyst 11 becomes less than substantially 10 percent of the HC oxidation rate when using the $NO_x$ storing catalyst 12. Therefore, it can also be said that the $SO_x$ trap catalyst 11 is strengthened in basicity and weakened in oxidizability compared with the $NO_x$ storing catalyst 12 to an extent so that, when the temperature of the $SO_x$ trap catalyst is in the temperature range at the time of ordinary operation, that is, substantially 150° C. to substantially 400° C., the HC oxidation rate by the $SO_x$ trap catalyst 11 becomes less than substantially 10 percent of the HC oxidation rate by the $NO_x$ storing catalyst 12 at all times.

Note that the smaller the amount of the precious metal catalyst, the weaker the HC oxidation action, so in the embodiments according to the present invention, the amount of the precious metal catalyst 52 carried on the $SO_x$ trap catalyst 11 is smaller than the amount of the precious metal catalyst 46 carried on the $NO_x$ storing catalyst 12.

Now, as explained above, in the embodiments according to the present invention, when the $SO_x$ trap rate falls below the predetermined rate, the temperature raising control such that the $SO_x$ trap catalyst 11 is raised in temperature under a lean air-fuel ratio of the exhaust gas is performed and thereby the $SO_x$ trap rate is restored. In this case, in the embodiments according to the present invention, the reducing agent is fed from the reducing agent supply valve 14 and the temperature of the $SO_x$ trap catalyst 11 is raised by the heat of oxidation reaction of this reducing agent.

Note that in the present invention, basically, it is assumed that the $SO_x$ trap catalyst 11 will be used as it is without replacement from the time of purchase of the vehicle to its end of life. In recent years, the amount of sulfur contained in fuel in particularly has been reduced. Therefore, if the capacity of the $SO_x$ trap catalyst 11 is made larger to a certain extent, the $SO_x$ trap catalyst 11 can be used as it is until the end of life of the vehicle without replacement. For example, if the potential running distance of a vehicle is 500,000 km, the capacity of the $SO_x$ trap catalyst 11 is made a capacity enabling $SO_x$ to continue to be trapped by a high $SO_x$ trap rate without temperature raising control until about 250,000 km. In this case, the initial temperature raising control is performed at about 250,000 km.

Next, a first embodiment of the $SO_x$ stabilization processing at the $SO_x$ trap catalyst 11 will be explained while referring to FIG. 9 to FIG. 11.

In the first embodiment, the amount of $SO_x$ trapped by the $SO_x$ trap catalyst 11 is estimated. When the amount of $SO_x$ trapped by the $SO_x$ trap catalyst 11 exceeds a predetermined amount, it is judged that the $SO_x$ trap rate has fallen lower than the predetermined rate. At this time, to restore the $SO_x$ trap rate, the temperature of the $SO_x$ trap catalyst 11 is raised under a lean air-fuel ratio of the exhaust gas in temperature raising control.

That is, fuel contains a certain ratio of sulfur. Therefore, the amount of $SO_x$ contained in the exhaust gas, that is, the amount of $SO_x$ trapped by the $SO_x$ trap catalyst 11, is proportional to the fuel injection amount. The fuel injection amount is a function of the required torque and the engine speed. Therefore, the amount of $SO_x$ trapped by the $SO_x$ trap catalyst 11 also becomes a function of the required torque and the engine speed. In this embodiment of the present invention, the $SO_x$ amount SOXA trapped per unit time in the $SO_x$ trap catalyst 11 is stored as a function of the required torque TQ and the engine speed N in the form of a map as shown in FIG. 9(A) in advance in the ROM 32.

Further, lubrication oil contains a certain ratio of sulfur. The amount of lubrication oil burned in a combustion chamber 2, that is, the amount of $SO_x$ contained in the exhaust gas and trapped in the $SO_x$ trap catalyst 11, becomes a function of the required torque and the engine speed. In this embodiment of the present invention, the amount SOXB of $SO_x$ contained in the lubrication oil and trapped per unit time in the $SO_x$ trap catalyst 11 is stored as a function of the required torque TQ and the engine speed N in the form of a map as shown in FIG. 9(B) in advance in the ROM 32. By cumulatively adding the $SO_x$ amount SOXA and the $SO_x$ amount SOXB, the $SO_x$ amount ΣSOX trapped in the $SO_x$ trap catalyst 11 is calculated.

Further, in this embodiment of the present invention, as shown in FIG. 9(C), the relationship between the $SO_x$ amount ΣSOX and the predetermined $SO_x$ amount SO(n) when raising the temperature of the $SO_x$ trap catalyst 11 is stored in advance. When the $SO_x$ amount ΣSOX exceeds the predetermined SO(n) (n=1, 2, 3, . . . ), temperature raising control of the $SO_x$ trap catalyst 11 is performed. Note that in FIG. 9(C), n shows the number of times of the temperature raising processing. As will be understood from FIG. 9(C), as the number of times n of temperature raising processing for restoring the $SO_x$ trap rate increases, the predetermined amount SO(n) is increased. The rate of increase of the predetermined amount SO(n) is reduced the greater the number of times n of processing. That is, the rate of increase of SO(d) to SO(2) is reduced from the rate of increase of SO(2) to SO(1).

Figure 10:
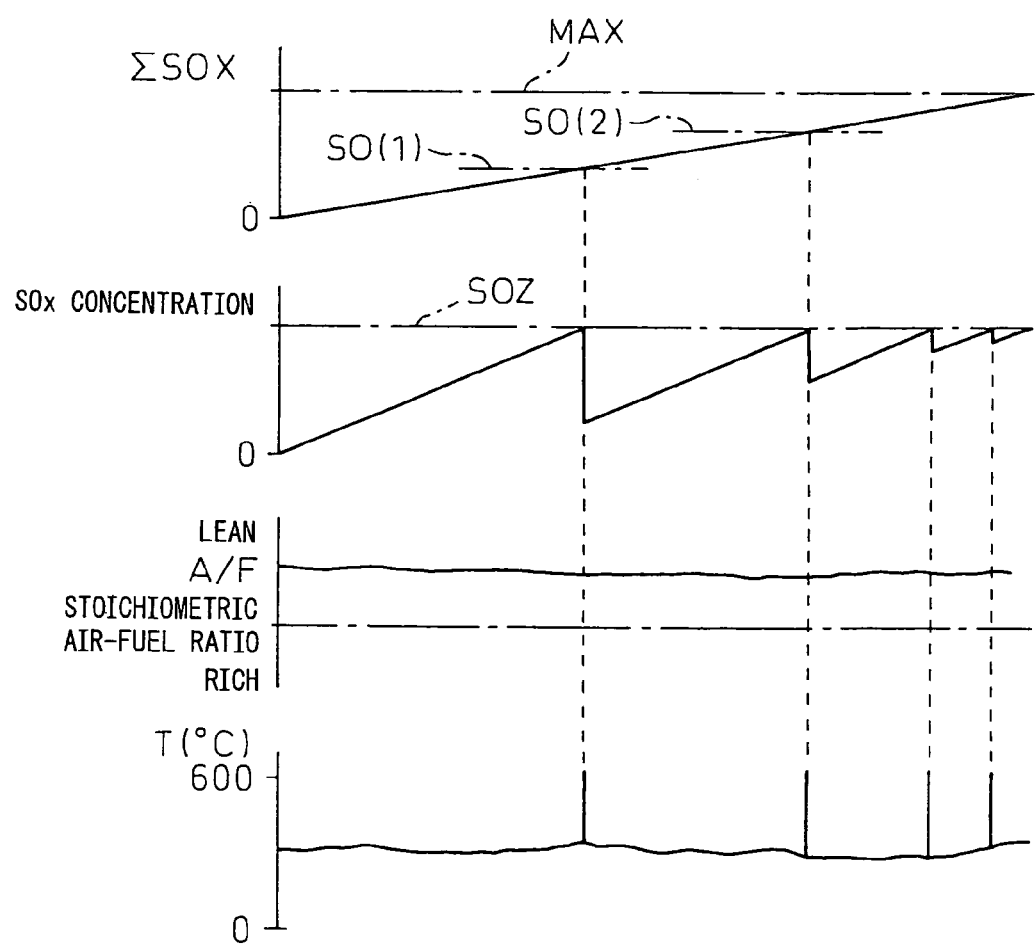
FIG. 10 is a time chart of changes in the stored $SO_x$ amount $\Sigma SOX$ etc.

That is, as shown by the time chart of FIG. 10, the amount ΣSOX of $SO_x$ trapped by the $SO_x$ trap catalyst 11 continues to increase along with the elapse of time until the allowable value MAX. Note that in FIG. 10, the time when ΣSOX=MAX is the time of the running distance of about 500,000 km.

On the other hand, in FIG. 10, the concentration of $SO_x$ shows the concentration of $SO_x$ near the surface of the $SO_x$ trap catalyst 11. As will be understood from FIG. 10, when the concentration of $SO_x$ near the surface of the $SO_x$ trap catalyst 11 exceeds the allowable value SOZ, the temperature T of the $SO_x$ trap catalyst 11 is raised under a lean air-fuel ratio A/F of the exhaust gas in the temperature raising control. When the temperature raising control is performed, the concentration of $SO_x$ near the surface of the $SO_x$ trap catalyst 11 falls, but the amount of reduction of the $SO_x$ concentration becomes smaller with each temperature raising control routine. Therefore, the period from when one temperature raising control routine is performed to the next temperature raising control is performed becomes shorter with each temperature raising control routine.

Note that as shown in FIG. 10, the trapped $SO_x$ amount ΣSOX reaching SO(1), SO(2), . . . means the concentration of $SO_x$ near the surface of the $SO_x$ trap catalyst 11 reaching the allowable value SOZ.

Figure 11:
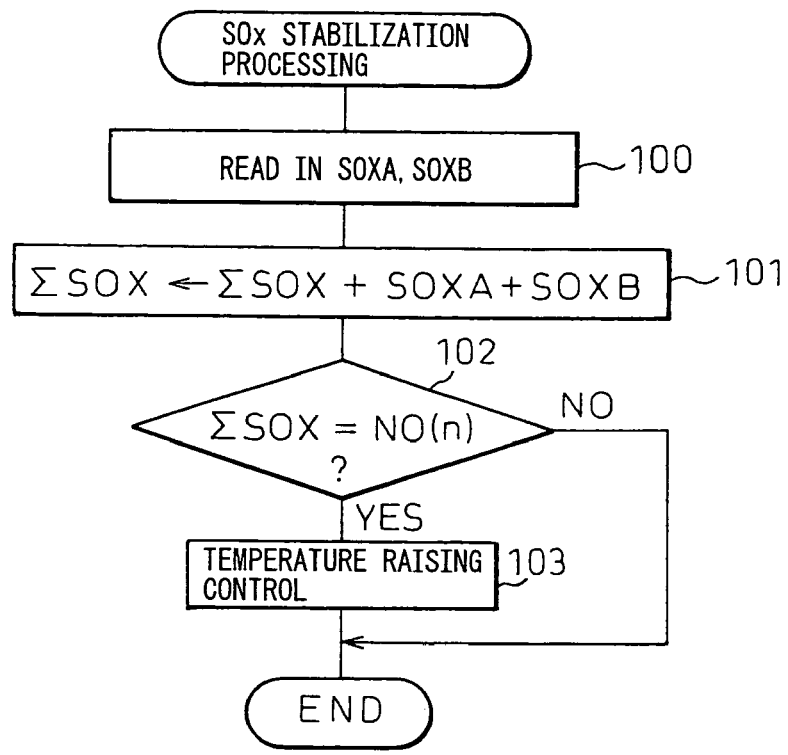
FIG. 11 is a flow chart for working a first embodiment of $SO_x$ stabilization processing.

FIG. 11 shows the routine for executing the first embodiment of the $SO_x$ stabilization processing.

Referring to FIG. 11, first, at step 100, the amounts SOXA and SOXB of the $SO_x$ trapped per unit time are read from FIG. 9(A) and FIG. 9(B). Next, at step 101, the sum of these SOXA and SOXB is added to the $SO_x$ amount ΣSOX. Next, at step 102, it is judged if the $SO_x$ amount ΣSOX has reached the predetermined amount SO(n) (n=1, 2, 3, . . . ) shown in FIG. 9(C). When the $SO_x$ amount ΣSOX has reached the predetermined amount SO(n), the routine proceeds to step 103, where temperature raising control is performed.

Figure 12:
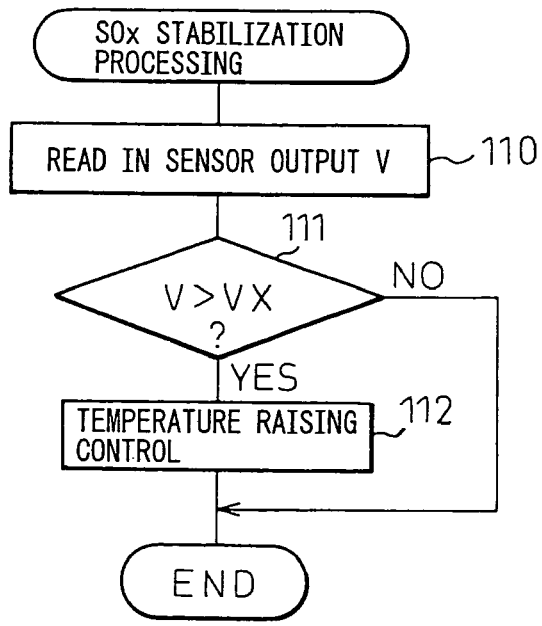
FIG. 12 is a flow chart for working a second embodiment of $SO_x$ stabilization processing.
Figure 13:
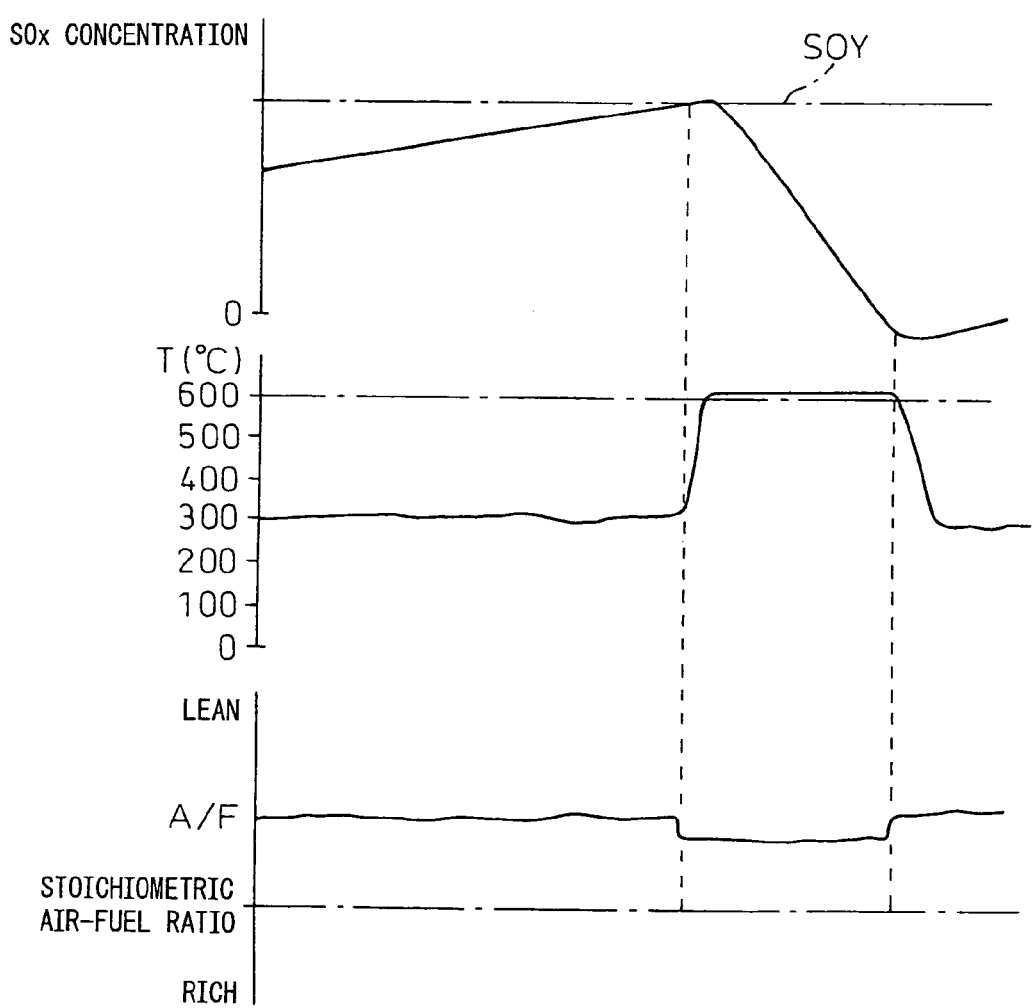
FIG. 13 is a time chart of $SO_x$ stabilization processing.

FIG. 12 and FIG. 13 show a second embodiment of the $SO_x$ stabilization processing. In this embodiment, as shown in FIG. 2, the $SO_x$ sensor 24 is arranged downstream of the $SO_x$ trap catalyst 11. This $SO_x$ sensor 24 detects the concentration of $SO_x$ in the exhaust gas flowing out from the $SO_x$ trap catalyst 11. That is, in the second embodiment, as shown in FIG. 13, when the concentration of $SO_x$ in the exhaust gas detected by the $SO_x$ sensor 24 exceeds the predetermined concentration SOY, it is judged that the $SO_x$ trap rate has fallen below the predetermined rate. At that time, to restore the $SO_x$ trap rate, the temperature T of the $SO_x$ trap catalyst 11 is raised under a lean air-fuel ratio A/F of the exhaust gas in the temperature raising control.

FIG. 12 shows the routine for executing the second embodiment.

Referring to FIG. 12, first, at step 110, the output signal of the $SO_x$ sensor 24, for example, the output voltage V, is read. Next, at step 111, it is judged whether the power voltage V of the $SO_x$ sensor 24 has exceeded a setting VX, that is, if the concentration of $SO_x$ in the exhaust gas has exceeded the predetermined concentration SOY. When V>VX, that is, when the concentration of $SO_x$ in the exhaust gas has exceeded the predetermined concentration SOY, the routine proceeds to step 112, where the temperature raising control is performed.

Figure 14:
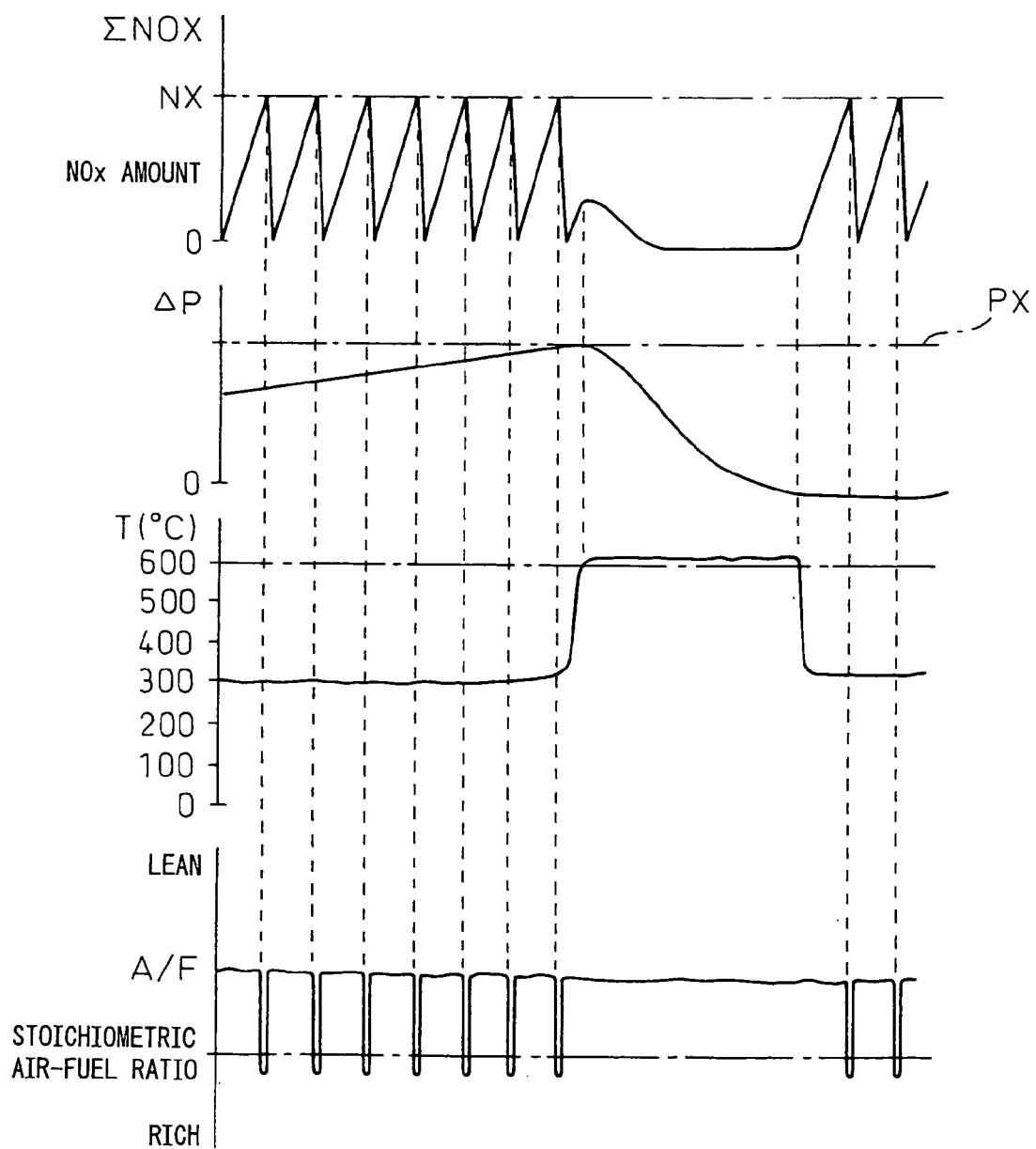
FIG. 14 is a time chart of temperature raising control of a particulate filter.

Next, the processing for the $NO_x$ storing catalyst 12 will be explained while referring to FIG. 14.

Figure 15:
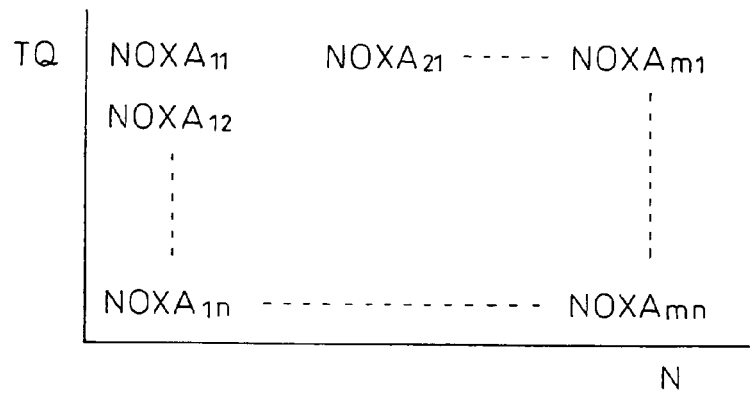
FIG. 15 is a view of a stored $NO_x$ amount NOXA map.

In this embodiment of the present invention, the amount NOXA of $NO_x$ stored per unit time in the $NO_x$ storing catalyst 12 is stored as a function of the required torque TQ and the engine speed N in the form of the map shown in FIG. 15 in advance in the ROM 32. By cumulatively adding this $NO_x$ amount NOXA, the amount ΣNOX of $NO_x$ stored in the $NO_x$ storing catalyst 12 is calculated. In this embodiment of the present invention, as shown in FIG. 14, each time the $NO_x$ amount ΣNOX reaches the allowable value NX, the air-fuel ratio A/F of the exhaust gas flowing into the $NO_x$ storing catalyst 12 is made temporarily rich, whereby $NO_x$ is released from the $NO_x$ storing catalyst 12.

On the other hand, the particulate matter contained in the exhaust gas is trapped on the particulate filter 12a carrying the $NO_x$ storing catalyst 12 and successively oxidized. However, if the amount of the particulate matter trapped becomes greater than the amount of the particulate matter oxidized, the particulate matter will gradually deposit on the particulate filter 12a. In this case, if the deposition of particulate matter increases, the output power of the engine drops and thus, it is necessary to remove the deposited particulate matter. In this case, if raising the temperature of the particulate filter 12a under an excess of air to about 600° C., the deposited particulate matter is oxidized and removed.

Therefore, in this embodiment of the present invention, when the amount of the particulate matter deposited on the particulate filter 12a exceeds the allowable amount, the temperature of the particulate filter 12a is raised under a lean air-fuel ratio of the exhaust gas and thereby the deposited particulate matter is removed by oxidation. Specifically speaking, in this embodiment of the present invention, when the differential pressure ΔP before and after the particulate filter 12a detected by the differential pressure sensor 23 exceeds the allowable value PX as shown in FIG. 14, it is judged that the amount of deposited particulate matter has exceeded the allowable amount. At that time, the air-fuel ratio of the exhaust gas flowing into the particulate filter 12a is maintained lean and the temperature T of the particulate filter 12a is raised in the temperature raising control. Note that if the temperature T of the particulate filter 12a becomes high, the amount of $NO_x$ ΣNOX trapped falls due to release of $NO_x$ from the $NO_x$ storing catalyst 12.

Figure 16:
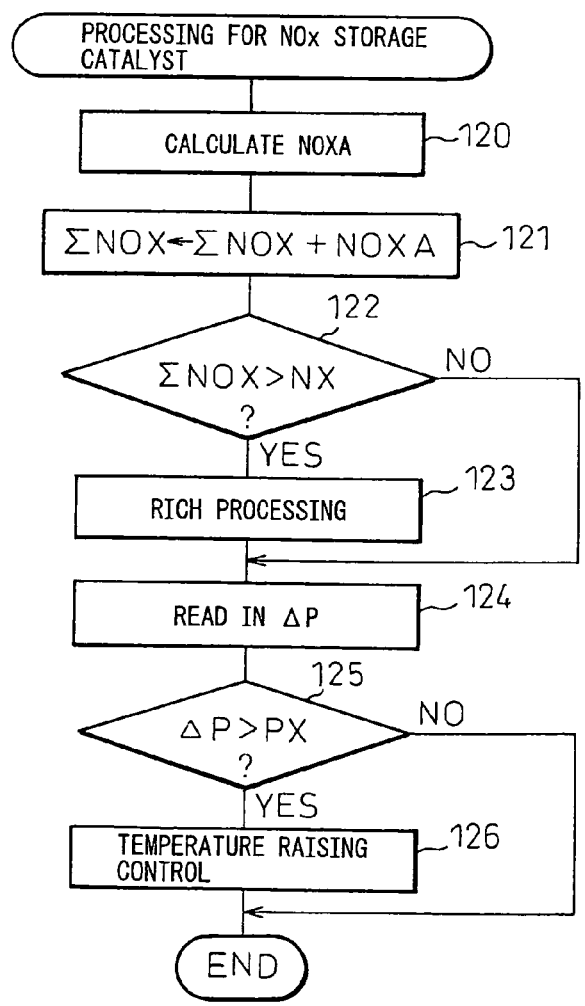
FIG. 16 is a flow chart for execution of processing for the $NO_x$ storing catalyst.

FIG. 16 shows the processing routine for the $NO_x$ storing catalyst 12.

Referring to FIG. 16, first, at step 120, the amount NOXA of $NO_x$ absorbed per unit time is calculated from the map shown in FIG. 15. Next, at step 121, this NOXA is added to the $NO_x$ amount ΣNOX stored in the $NO_x$ storing catalyst 12. Next, at step 122, it is judged if the stored $NO_x$ amount ΣNOX has exceeded the allowable value NX. When ΣNOX>NX, the routine proceeds to step 123, where rich processing is performed to switch the air-fuel ratio of the exhaust gas flowing into the $NO_x$ storing catalyst 12 by the reducing agent supplied from the reducing agent supply valve 14, temporarily from lean to rich and ΣNOX is cleared.

Next, at step 124, the differential pressure sensor 23 is used to detect the differential pressure ΔP before and after the particulate filter 12a. Next, at step 125, it is judged if the differential pressure ΔP has exceeded the allowable value PX. When ΔP>PX, the routine proceeds to step 126, where temperature raising control of the particulate filter 12a is performed. This temperature raising control is performed by maintaining the air-fuel ratio of the exhaust gas flowing into the particulate filter 12a lean and supplying reducing agent from the reducing agent supply valve 14.

The invention claimed is:

1. An exhaust purification device of a compression ignition type internal combustion engine, comprising: an $SO_x$ trap catalyst arranged in an engine exhaust passage for trapping $SO_x$ contained in an exhaust gas and an $NO_x$ storing catalyst arranged in the exhaust passage downstream of the $SO_x$ trap catalyst for storing $NO_x$ contained in the exhaust gas when an air-fuel ratio of an inflowing exhaust gas is lean and releasing stored $NO_x$ when the air-fuel ratio of the inflowing exhaust gas becomes a stoichiometric air-fuel ratio or rich, wherein the $SO_x$ trap catalyst is strengthened in basicity and is weakened in oxidizability compared with the $NO_x$ storing catalyst to an extent so that when a temperature of the $SO_x$ trap catalyst is substantially 150° C. to substantially 400° C., the $NO_x$ purification rate by the $SO_x$ trap catalyst becomes less than substantially 10 percent of the $NO_x$ purification rate by the $NO_x$ storing catalyst, and, when $NO_x$ should be released from the $NO_x$ storing catalyst, the air-fuel ratio of the exhaust gas flowing into the $SO_x$ trap catalyst is temporarily switched from lean to rich.

2. An exhaust purification device of a compression ignition type internal combustion engine as set forth in claim 1, wherein said $SO_x$ trap catalyst is strengthened in basicity and weakened in oxidizability compared with said $NO_x$ storing catalyst to an extent so that when a temperature of the $SO_x$ trap catalyst is substantially 150° C. to substantially 400° C., the HC oxidation rate by the $SO_x$ trap catalyst also becomes less than substantially 10 percent of the HC oxidation rate by the $NO_x$ storing catalyst at all times.

3. An exhaust purification device of a compression ignition type internal combustion engine as set forth in claim 1, wherein a reducing agent supply device is arranged in the exhaust passage upstream of the $SO_x$ trap catalyst and, when $NO_x$ should be released from the $NO_x$ storing catalyst, a reducing agent is fed into the exhaust passage from the reducing agent supply device to temporarily make the exhaust gas flowing into the $NO_x$ storing catalyst a rich air-fuel ratio.

4. An exhaust purification device of a compression ignition type internal combustion engine as set forth in claim 1, wherein said $SO_x$ trap catalyst comprises a coat layer formed on a catalyst carrier and a precious metal catalyst carried on the coat layer, said coat layer contains an alkali metal, alkali earth metal, or rare earth metal dispersed in the coat layer, and said $NO_x$ storing catalyst comprises a catalyst carrier on which an $NO_x$ absorbent selected from an alkali metal, alkali earth, or rare earth and a precious metal catalyst are carried.

5. An exhaust purification device of a compression ignition type internal combustion engine as set forth in claim 4, wherein an amount of precious metal catalyst carried on said $SO_x$ trap catalyst is smaller than an amount of precious metal catalyst carried on said $NO_x$ storing catalyst.

6. An exhaust purification device of a compression ignition type internal combustion engine as set forth in claim 1, wherein the $NO_x$ storing catalyst is carried on a particulate filter for trapping and oxidizing particulate matter contained in the exhaust gas.

7. An exhaust purification device of a compression ignition type internal combustion engine as set forth in claim 6, wherein when the amount of the particulate matter deposited on the particulate filter exceeds an allowable amount, the particulate filter is raised in temperature under a lean air-fuel ratio of the exhaust gas and thereby a deposited particulate matter is removed by oxidation.

8. An exhaust purification device of a compression ignition type internal combustion engine as set forth in claim 1, wherein said $SO_x$ trap catalyst has a property that the trapped $SO_x$ gradually diffuses inside the $SO_x$ trap catalyst when the $SO_x$ trap catalyst rises in temperature under a lean air-fuel ratio of the exhaust gas flowing into the $SO_x$ trap catalyst, estimating means for estimating an $SO_x$ trap rate showing a ratio of $SO_x$ trapped by the $SO_x$ trap catalyst to the $SO_x$ contained in the exhaust gas is provided, and, when the $SO_x$ trap rate falls below a predetermined rate, the $SO_x$ trap catalyst is raised in temperature under a lean air-fuel ratio of the exhaust gas and thereby the $SO_x$ trap rate is restored.

9. An exhaust purification device of a compression ignition type internal combustion engine as set forth in claim 8, wherein an amount of $SO_x$ trapped by said $SO_x$ trap catalyst is estimated, when the amount of $SO_x$ trapped by the $SO_x$ trap catalyst exceeds a predetermined amount, it is judged that the $SO_x$ trap rate has fallen below a predetermined rate, and, at this time, to restore the $SO_x$ trap rate, the $SO_x$ trap catalyst is raised in temperature under a lean air-fuel ratio of the exhaust gas.

10. An exhaust purification device of a compression ignition type internal combustion engine as set forth in claim 9, wherein as the number of times of treatment for restoring the $SO_x$ trap rate increases, said predetermined amount is increased and the rate of increase of this predetermined amount is reduced the greater the number of times of treatment.

11. An exhaust purification device of a compression ignition type internal combustion engine as set forth in claim 8, wherein an $SO_x$ sensor able to detect an $SO_x$ concentration in the exhaust gas is arranged in the exhaust passage downstream of the $SO_x$ trap catalyst and the $SO_x$ trap rate is calculated from the output signal of said $SO_x$ sensor.

12. An exhaust purification device of a compression ignition type internal combustion engine as set forth in claim 11, wherein when the $SO_x$ concentration in the exhaust gas detected by the $SO_x$ sensor exceeds a predetermined concentration, it is judged that the $SO_x$ trap rate has fallen below a predetermined rate and, at this time, to restore the $SO_x$ trap rate, the $SO_x$ trap catalyst is raised in temperature under a lean air-fuel ratio of the exhaust gas.

* * * * *